Aug. 28, 1928.

J. BIJUR 1,682,721

COUPLING AND THE LIKE

Filed Oct. 5, 1921    2 Sheets-Sheet 1

INVENTOR
JOSEPH BIJUR
BY
Dean, Fairbank, Obright & Hirsch
ATTORNEYS.

Patented Aug. 28, 1928.

1,682,721

UNITED STATES PATENT OFFICE.

JOSEPH BIJUR, OF NEW YORK, N. Y.

COUPLING AND THE LIKE.

Application filed October 5, 1921. Serial No. 505,593.

My present invention relates to mechanical couplings for driving one shaft element from another and with regard to its more specific applications to couplings of the type by which the need for precision in the alignment of the shafts is eliminated. The invention has application broadly for transmitting torque from a power or driving element to an adjacent driven machine or shaft. The embodiment disclosed, although of broad utility is particularly applicable to automotive vehicles, as for instance, in transmitting torque between the engine and accessory machines, such as magnetos, generators and water pumps.

The invention in its preferred application is concerned with the type of coupling structure in which each hub is connected to or carries a separate and distinct yieldable member extending about the axis of the coupling, the two yieldable elements being in turn drivingly connected by a more rigid transmission member, although certain important features of the invention are more broadly applicable to other structural types of couplings.

It is an object of the invention to provide a simple, reliable and durable coupling, which shall transmit the torque even between poorly aligned shafts with a minimum of wear upon the associated shaft bearings.

Another object is to provide a practical coupling of the above type of short length useful in relations where economy of length is desirable or required and where the distance between adjacent shaft ends is correspondingly small, and which coupling shall yet lend itself readily to connection between shaft ends separated by a greater interval.

Another object is to provide a coupling in which the connecting elements for holding the constituent coupling parts in assembled relation firmly retain their hold without the likelihood of wear or loosening even under severe conditions of use, so that the yield in the coupling shall be confined to the elements intended to yield, avoiding rattling and eliminating a cause of lag and lead of the shafts with respect to each other.

Another object is to provide a coupling of the above type, the connecting parts of which shall be simple and easily accessible for facility in mounting into operative position, and removal, or dismounting and without the use of specialized tools or the exercise of dexterity.

Another object is to provide a coupling which shall readily flex for application to misaligned shafts without yielding in the driving direction, and which shall yet be so constructed and arranged that destructive distortion or flexure beyond safe limits is avoided.

Another object is to provide a coupling of the above type in which the flexible parts shall be easily and quickly removable for replacement, without the exercise of skill or the use of specialized tools.

Another object is to provide a coupling of the above type in which the fastening means for holding the flexible element in position shall be so differentiated from those holding the hub units to the transmission element, as to avoid the possibility of confusion when a coupling is to be removed from the shaft or when a flexible element is to be replaced.

Another object is to provide a coupling of the above type, the parts of which shall not interfere with the vertical movement up or down of the coupled machine, such as a magneto, in removal or installation.

Other objects will be in part obvious and in part pointed out hereinafter.

In my copending application, Serial No. 531,009, filed January 23, 1922, I have presented the claims generic to the disclosures of the two applications.

The above and other features of my invention may be more fully understood from the accompanying drawings in which are shown one or more of various possible embodiments of the several features of the invention.

Fig. 6 is a view similar to Fig. 1 of a modified form of the invention, Figs. 7 and 8 are views of said modified form respectively, similar to Figs. 2 and 3, Fig. 9 is a sectional detail taken along line 9—9 of Fig. 7, Fig. 10 is a detail of the transmission element, Fig. 12 is a sectional view taken along the line 12—12 of Fig. 11, Fig. 13 is a fragmentary plan of a hub detail, Fig. 14 is a fragmentary plan of another hub detail, Fig. 15 is a view similar to Fig. 7 of a further modification, Fig. 16 is a sectional view taken along the line 16—16 of Fig. 15, showing one of the hubs and the associated ring, Fig. 17 is a view of a fragment of wire stock used for the flexible coupling element, Fig. 18 is a view similar to Fig. 11 of a modified form of clip, and;

Fig. 19 is a section taken along the line 19—19 of Fig. 18.

Referring now to Figs. 1 to 5 of the drawings, there is represented a coupling comprising a pair of hubs 1 of familar form, each provided with a flange 2 extending outwardly therefrom along one diameter, the said flange being preferably a stamping having a central opening 3 passed over the hub, the hub upset as at 4 into scallops 5 at the edge of the flange opening to rigidly secure the parts together. Thus, by a simple operation, the flange is fastened to the hub both against removal and against relative rotation, the upset rim performing the first function, and the hub metal pressed into the scallops, the second.

Figure 1:
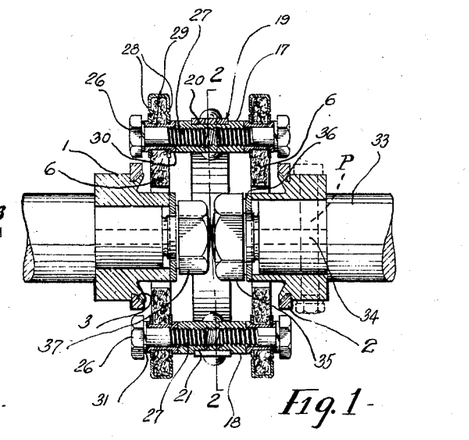
Fig. 1 is a view in transverse section taken along the line 1—1 of Fig. 2.
Figure 2:
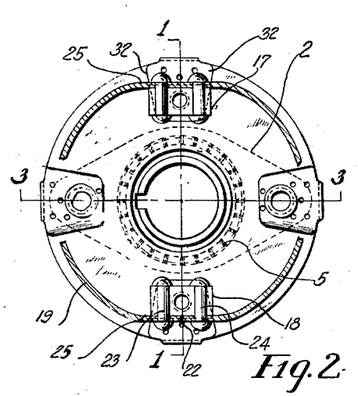
Fig. 2 is a sectional view taken along the line 2—2 of Fig. 1.
Figure 5:
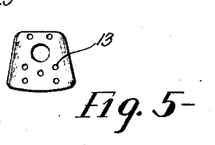
Fig. 5 is a plan view of a clamping plate detail.

The coupling includes a pair of identical rings 6, preferably composed of rubber and canvas, having an outer diameter somewhat larger than that of the flange and a substantial width for strength, the inner periphery, in the embodiment shown, being of a diameter little larger than that of the hub. Each of the flexible rings is secured at diametrically opposite points, to the corresponding flange 2 near the outer ends thereof, each of said securing means being constructed and arranged as follows: A bolt 7 extends through the ring and the flange and is upset as at 8 to prevent loosening or loss of the associated nut 9 which is located at the outer surface of the flange. To provide a firm non-tearing connection between the bolt and the flexible member, metal guard clamp plates 10 and 11 preferably cover opposite surfaces of the flexible ring in the region of the bolt and have apertures 12 through which the bolt extends. The plates preferably have sharp embossed points 13 digging into the material of the ring to establish a firm frictional hold. Each of the pairs of plates 10, 11 is positively pressed and secured in position upon the ring by means of a rivet 14 which has a rim 15 rolled over the aperture 12 in the metallic plate 10 and a squared flat head 16 of substantial thickness, that is, a head having its flat surface at right angles to the rivet axis, overlapping the edge of the aperture 12 in the other plate 11. The plates 10 and 11 are thus firmly held in position by the rivets 14 against separation from the flexible ring and the rivet in turn acts as a protective guard for the aperture in the ring, through which the bolt shank extends. The flange 2 is firmly clamped by each of the bolts near opposite ends thereof against the corresponding squared rivet head adjacent thereto, said heads thus serving as spacers between the flange and the ring for purposes that will appear below. Obviously, each pair of clamp plates 10 and 11 might be formed, if desired, in a single U-shaped clip straddling the periphery of the ring as shown in Fig. 2.

Figure 3:
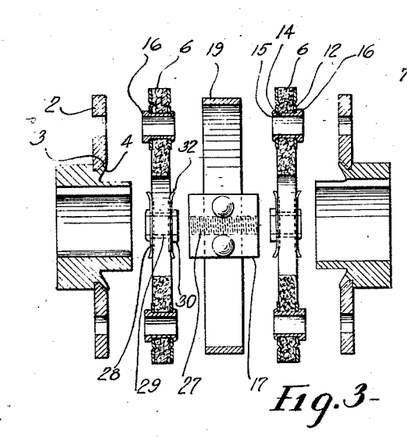
Fig. 3 is a sectional view taken along the line 3—3 of Fig. 2, showing the constituent parts separated and aligned in the proper order for assembly.
Figure 4:
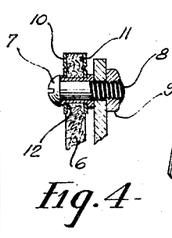
Fig. 4 is a fragmentary view in cross-section of one of the fastening elements.

Two hub units of the character described, each comprising a hub with a flange having a flexible ring bolted thereto are preferably connected by an intermediate transmission piece. The transmission piece in the preferred embodiment comprises a pair of preferably rectangular bridging blocks 17, 18 of substantial width and of lesser thickness, normally extending parallel to the coupling axis, the said bridging blocks serving as direct connections between the rings, at points midway between the ends of the flanges. The bridging blocks are connected together by a metal band 19 substantially narrower than the length of the bridges, generally circular in form of diameter somewhat smaller than the outer diameter of the rings and fitting snugly in corresponding grooves 20 and 21 in the outer surfaces of the bridge blocks and midway between the ends thereof. The free ends of the band preferably abut as at 22 between the ends of the groove 21 in one of the blocks and are positively secured in place by rivets 23 and 24. Preferably the generally circular band 19 is flattened as at 25, at the parts fitting upon the bridging blocks for snug surface engagement with the grooves, to prevent shift of the band with respect to the parallel bridging pieces. The band is obviously very stiff in an edgewise direction, so that it will not buckle to allow the bridges to move out of parallelism.

The transmission unit consisting of the bridging blocks 17 and 18 and the connecting band 19 is preferably associated with the two hub units in a manner which will be apparent from the drawings. The hub units are disposed with the lengths of flanges 2 extending along the same axial plane of the coupling and in parallel relation, as best shown in Fig. 3. The transmission unit is interposed between the two rings with the bridging blocks midway between the flange ends or spaced by 90 degrees from the bolts 7 which connect the rings to the flanges. The connection between each of the rings and the transmission element is preferably effected by cap screws 26, extending transversely through the rings and threaded into tapped openings 27 in the bridging blocks. For this purpose preferably metallic plates 28 similar to those heretofore described are clamped in position by rivets 29, also similar to those heretofore described, in which the thickened squared heads 30, however, project from the sides facing the bridging blocks to effect a square pull-up against the ends of the bridging elements. Preferably each screw is provided with a lock washer 31 to prevent loosening or disconnection by vibration. It is seen that the connection between the rings and the hub flanges on the one hand and between the rings and the transmission piece on the other, are particularly firm and unyielding, the threaded clamping member in each case coming in contact with and exerting pressure upon firm metal parts only, which in turn prevent wear and tear of the rubber and fabric elements.

The screw 26 when tightened, of course, exerts clamping pressure in an axial direction upon the rivet 29, and not upon the rubber and fabric ring. The rivet thus forms a rigid reaction piece for the lock washer 31, where in the absence of the rivet or its equivalent, the clamping pressure would be taken by the flexible ring, which may yield sufficiently in the direction of compression even under high pressure to render the lock washer inefficacious.

The set of clamping plates 10, 11, 28 with the associated rivets 29, as seen are substantially a permanent part of the flexible rings, constituting in effect mechanical terminals therefor.

In the preferred embodiment the lateral edges of all of the sixteen metal plates 10, 11, 28 are flared as at 32 to serve as limiting guides for preventing sharp bends in operation and consequent tear or rupture of the flexible rings beyond the clamping plates, particularly when the coupling transmits torque between poorly aligned shafts. The thickened squared rivet heads 16 and 30 serve as spacers between the flexible rings and the hub flanges and bridging pieces respectively, so that when the bolts 7 and screws 26 respectively are tightened, there shall be sufficient space for the flares 32 and no danger of flattening them.

Starting with a completely assembled coupling, the same is mounted to transmit torque between a pair of shaft ends by merely removing a pair of the screws 26 connecting one of the flexible rings 6 to the transmission unit. The other hub 1 with the ring 6 and the transmission unit 17, 18, 19 mounted thereon is then slipped over the shaft 33 and is keyed thereto as by a Woodruff key 34, whereupon the usual nut 35 is threaded upon the extreme end of the shaft and tightened by means of a wrench and secured by a lock washer 36. It will be seen that the nut is readily accessible for the wrench, since the transmission piece is spaced from the axis of the coupling by a distance practically that of the outer diameter of the coupling, the bridge pieces extending inwardly for but a small range and not interfering with the operation of the wrench. The other hub having been similarly applied to the other shaft and secured thereto by tightening the nut 37, one of the shafts is moved toward the other until the bridges 17, 18 mounted on one of the hubs are brought into alignment with the square shoulder rivet head 30 on the other hub, whereupon the screws 26 each carrying a lockwasher 31 are passed through the plates and threaded into the tapped openings 27 in the bridge pieces and tightened.

Thus my construction is readily connected operatively in the usual approved practical manner, by means of nuts upon the shafts pressed against the hubs and located between the ends of the coupling and this without the need for separating the transmission element from both hubs, which would occur where the transmission element has too small a diameter or too great a length for convenient access of a wrench. After attachment of a hub unit to one of the shafts and of the other hub unit with the transmission element thereon to the other shaft, only two screws need be tightened for securing the hub unit to the transmission element to complete the application.

As shown in the drawings, the hubs 1 extend outwardly beyond the flanges for convenience in the use of an alternative shaft connection, shown in dotted lines in Fig. 1. For this purpose the hub and shaft would be perforated to accommodate the pin P extending transversely therethrough. Obviously substantially the entire length of hub beyond the flange could be dispensed with if the coupling is to be used only with a nut or equivalent fastening for the shafts applied between the flanges.

It will be seen that the flexible ring quadrants extend freely between the points of attachment to the flange and the points of attachment to the transmission piece, and as heretofore noted, the portions of the rings overlapping the flanges 2 are spaced therefrom by the rivet heads and are spaced by a material distance from the band 19 of the transmission member. Thus, although the coupling is short in length, there is ample space allowed for flexure of the ring quadrants. The coupling has material flexibility in an axial direction for increase or decrease of effective length to permit of application to shaft ends spaced by a distance other than that corresponding to the length of the coupling. In this relation, the hubs are simply drawn away from or toward each other, the rings 6 readily flexing about the diameter determined by the bridging pieces 17 and 18. When the lengthening is appreciable, the radially inward stress upon the flexible rings at the points of attachment to the bridges may cause the latter to approach each other somewhat against the resistance of band 19, the latter yielding or flattening somewhat. Thus, the quadrants of the ring will be stretched less and last longer than if the bridge blocks are rigidly connected together and the longitudinal yield is greater than would be permitted in such case by the flares 32 above described.

When the two other shafts to be connected are mounted with ordinary care, then, as is well known the alignment is ordinarily inaccurate. The shafts strictly may extend with respect to each other at an angle somewhat less than 180 degrees or while extending at an angle of 180 degrees they may be displaced from each other laterally by a gap sometimes of almost 1/16 of an inch, or there may be both angular and lateral displacement, the shafts extending in slightly different planes. The coupling flexes readily for application between shafts related to each other in any of the above ways, and in operation, it will consequently exert little or no lateral pressure or wear on the shaft bearings. In driving with laterally misaligned shafts, as the bridges reach a horizontal diameter, the ends thereof facing the relatively raised shaft will cock upwardly and the opposite ends downwardly, the rings flexing correspondingly. The connecting band being rigidly mounted upon the bridges will be correspondingly tilted therewith, but will maintain the two bridges in accurate parallelism, so that neither ring will advance in the direction of rotation relative to the other. As the rotation proceeds and the bridges reach a vertical diameter of the coupling, the flexure of the rings will gradually be altered to place the halves of the rings above the raised shaft and below the lowered shaft, under compression, and the other semi-rings under tension.

Where the shafts are misaligned angularly, it will be seen that when the bridges are in a plane perpendicular to the common diameter of the shafts, the rings will be shifted in opposite directions about the line of connection to the bridges as an axis, and the flexure of the rings will continuously change in operation, until after rotation of the coupling through 90 degrees, the semi-rings connected to one of the bridges will be flexed toward each other, and the remaining semi-rings from each other. Thus, in the rapid rotation of the coupling, whether applied between shafts misaligned laterally, angularly, or both, each quadrant will pass through a cycle of flexure to compensate for the misalignment. There being ample space between the band and the inner surfaces of the rings and between the rings and the hub flanges, no interference will occur as a result of this flexure.

The transmission element made up of the two small bridging pieces and the light connecting band has small mass and sets up little centrifugal force, and no appreciable vibration will, therefore, result from its rotation out of center between poorly aligned shafts.

Since the connecting bridge pieces extend parallel to the coupling axis and are maintained parallel to each other, no lag or lead of one shaft with respect to the other can take place at any part of the rotation, which would not be the case if the transmission member were connected to the two rings at points out of axial alignment with each other. The operation is thus smooth, and does not set up the undesirable stress, which would follow from continual variation in speed of the driven shaft.

It will be seen that in the above action, sharp and destructive bends of the flexible rings adjacent the plates at which they are gripped are avoided, the flare 32 at the lateral edges of the plates forming a limiting guide to assure a relatively gradual deflection. The limiting guides may, of course, be members separate and distinct from the plates, if desired, but the specific construction shown and described is preferred.

Disconnection of the coupling from the shafts is readily effected by the use of a screw driver and wrench, the operation heretofore described in connection with the mounting being simply reversed. It will be seen that the two screws 26 associated with each ring are readily accessible from the exterior of the ring and readily removable, to separate a hub unit from the transmission piece, while there is no possibility of removal of the hub from the ring since the latter elements are connected by the upset bolts.

When it is desired to remove a flexible ring, as for replacement, it is merely necessary to file off the upset ends 8 of the two corresponding bolts 7 whereupon a new ring can be substituted together with a new pair of bolts, the ends of which in turn will be upset over the nuts.

In the form shown in Figs. 6 to 11 inclusive, many of the parts shown in Figs. 1 to 5 are employed, and such parts are identified by the same reference characters in both embodiments. Broadly, as in the embodiment shown in Figs. 1 to 5, a pair of the hub units each comprising a hub carrying a flexible ring are disposed at opposite sides of an interposed transmission element including bridging pieces to which the rings are secured at points, 90 degrees from or midway between the ends of the flanges.

Figures 6, 7, 9, 10, 12, 14, 15, 16, 17:
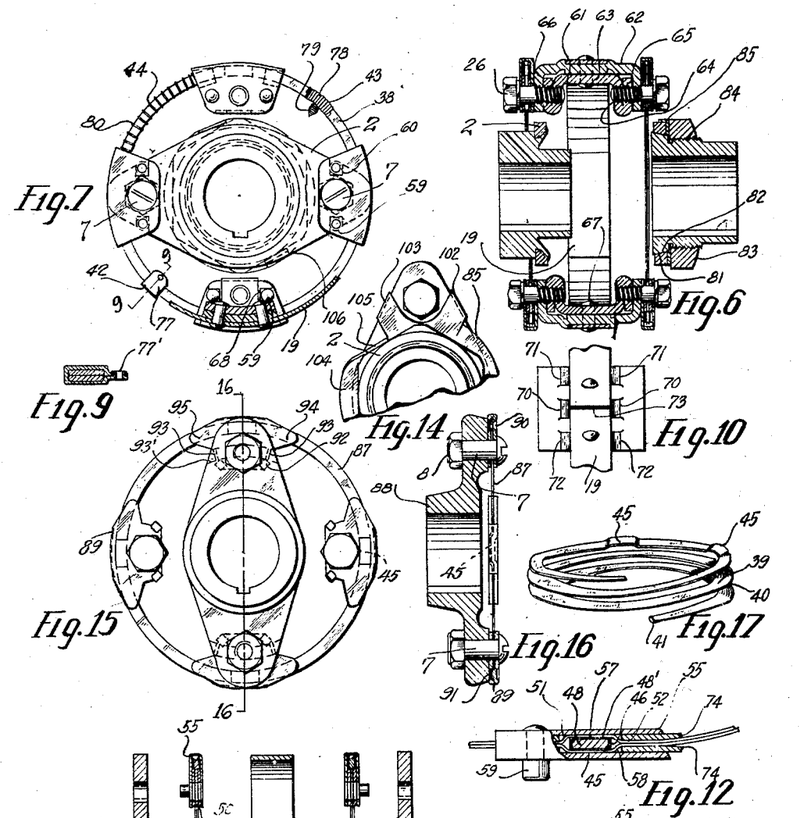

In the preferred embodiment the ring 38 is of large diameter substantially equal to the diameter of the flange and of small width. The flexible ring in the present embodiment is of metal, preferably at least as sound at its edges as between the edges. It may be formed of one or more sheet metal stampings, subsequently cut, filed or otherwise treated at its edges to remove the minute cracks which frequently develop thereat in the stamping process. Preferably, however, the ring is formed from drawn steel wire stock, flattened as shown and wound into a coil, a fragment of which is shown in Fig. 17. The ring may be made from round drawn wire, flattened by mechanical working, as by rolling or by passing through appropriate dies, and has width 39 materially greater than its thickness 40 and preferably a rounded edge 41. The term "drawn wire" is used for want of a better term to define the property of the material resulting from the drawing process and, of course, embraces wire of substantially the same properties made by other mechanical processes, such as set forth in the preceding sentence.

In the preferred embodiment, each coupling ring is formed by severing two complete circumferences 38 from the stock shown in Fig. 17 superposing them with the split end of one diametrically opposite the split end of the other and connecting them against relative slipping by any desired binding elements, alternative forms of which are shown at 42, 43 and 44 in Fig. 7 and will be fully described below.

Preferably the rings are provided with shallow offset depressions 45 at intervals of a quadrant, which may be formed in the stock, as shown in Fig. 17, for cooperation with fastening elements to secure the rings to the other coupling elements. The superposed rings are disposed with the concavities of the offsets facing each other as shown at 46 in Fig. 12 and at uniform intervals of a quadrant.

The four fastening elements or mechanical terminals on each ring are identical and preferably operate by a gripping action. Each gripping element comprises a small center plate 47 having a spacer tongue 48 extending radially outwardly into the space 46 between the two registering offsets and encircled by a sheet metal sleeve 48'. The center plate is straddled at its radially innermost edge 49 by a doubled plate or clip 50 cut away between the ends of its free edges as at 51 to clear the tongue 48 and the adjacent portions of the wires 38 and serving to clamp said wires beyond the block as at 52. For accurately positioning the clip with respect to the center plate, the plate has a short tongue 53 at its radially innermost edge 49 fitting into a corresponding slot 54 in the adjacent portion of the clip 50.

The construction thus far described is covered by an outer or cover clip 55 straddling the outer periphery of the wire, the sides of said outer clip overlapping the offset portions of the wires and the sides of the inner clip 50. The outer clip, the inner clip and the center plate are maintained in assembled relation preferably by a pair of rivets 56 extending through all these members and located at opposite sides of the spacer tongue, and spaced radially inwardly from the wires. As best shown at 57 in Fig. 12, the split end of each wire is in the center of an offset and the corresponding clamp units serve to hold the split ends against separation. The clamp element thus far described, will firmly grip the wires because of the substantial surface on which clamping pressure is applied, at the offset portions 45, and also beyond the same as at 52, the shoulders 58 connecting the offsets 45 to the main length of the wires serving also as substantially positive stops against slipping. The firm hold of the clamp is secured without perforating or notching the wires, so that the uniform strength of the wire throughout its length is preserved.

The ring thus far described is secured by two of the wire clamp units to the ends of the hub flange 2 by means of bolts 7 extending transversely through the various superposed plates and clip elements, preferably midway between the rivets 56 as shown in Fig. 7 and the bolt ends are upset as at 8 over the nuts, which are disposed at the outer surface of the flanges as in the embodiment shown in Figs. 1 to 5.

To rigidly retain the clamp units with respect to the flange, that is, to prevent any eventual rocking about the bolt as an axis, the rivets 56 that maintain the clips in assembled relation are preferably provided with relatively thick heads 59 (see Figs. 7 and 11) which extend into corresponding notches 60 in the edges of the hub flanges 2. The bridges are preferably provided with notches 68 at opposite sides, in which fit the thickened heads 59 of the rivets of the associated clamp units to prevent rocking of said units about the securing screws 26 in a manner generally similar to the relation of the other pair of clamps with respect to the hub flange. It will be seen that the notches 60 and 68 in the flanges and bridges respectively for preventing rocking of the clamp units, can be formed in the original blanking out process without need for special machining.

The transmission unit in the present embodiment comprises stamped metal bridging pieces instead of the quadrilateral stock pieces disclosed in Figs 1 to 4. Each of the bridging pieces comprises an inner U or channel-shaped stamping 61 and an outer U or channel-shaped stamping 62 straddling the same. The inner stamping includes a cross-piece 63 having legs 64 doubled over as at 65 and the legs 66 of the outer stamping overlap the doubled-over legs of the inner stamping, the bases of the channels contacting each other. The triple thickness of metal at each side of the composite bridging element thus formed is tapped to secure a firm hold for fastening screws 26 by which the clamp units midway between those attached to the hub flanges are secured to the bridging pieces. The yieldable connecting band 19 between the bridges is preferably similar to that shown in the embodiment of Figs. 1 to 5 and is preferably connected to the bridging pieces by the same rivets 67 which secure the two constituent elements of the bridge pieces together.

In the preferred embodiment the outer channel elements of the bridge pieces have three pairs of struck-up lugs 70, 71, and 72 for snugly contacting the opposite edges of the band 19, thereby preventing shift with respect to the bridging pieces and maintaining them at all times exactly at right angles to the length of the band, regardless of the strain to which the coupling is subjected. The central pair 70 of struck-up lugs on one of the bridging pieces extends transversely across the split ends 73 of the band, preventing any shifting thereof and the other pairs of lugs prevent any lateral shift of the band at the portions coacting therewith, so that each end of the band is firmly held at two spaced points, and, therefore, cannot change its angular relation with respect to the bridging pieces and is firmly anchored.

To prevent the likelihood of sharp bends of the metal ring units 38 adjacent the clamps which might in the absence of special precaution occur, particularly where the coupling is used to transmit power between shafts that are misaligned to a substantial degree, the clamps are preferably flared at the edges, as shown at 74 by rounding the lateral edges of the inner clip element 50, thereby guiding the wires for gentle curvature and preventing sharp bends which might bring about weakening and rupture of the wires, where they pass rapidly through their cycles of flexure in operation.

Preferably also the cover clip 55 as shown is formed with a smaller curvature than the wire, so that it diverges as at 75 from the outer periphery of the wire and preferably also the center plate 47 has oblique shoulders 76 diverging from the inner periphery of the wire, thus providing limiting stops to prevent excessive deflection of the wire in a radial direction, while preventing rubbing or friction between the wire and adjacent parts of the clip when the wire flexes lengthwise of the coupling or between the flares 74 of the clip in its rapidly repeated cycles of flexure.

The flexible metal driving rings being of small width relative to their periphery and the clamp units carried thereby of small width radially, ample space is afforded between the innermost edges of the opposite clips to readily clear a hub of conventional dimensions, as appears clearly in Fig. 6. It will thus be seen that the flexible metal ring construction can easily be passed over the outer end of the hub and can be secured to the outer face of the flange 2, thus providing a particularly short coupling construction, in which the thickness of the two rings and of the clamp units is not an added component of the overall length of the coupling. Of course, as suggested in Fig. 8, where desired, the flexible metal ring units may be secured to the inner surface of either or both of the flanges.

The binding means for retaining together the pair of wires, making up a ring element, are preferably in the form shown at 42 heretofore referred to and comprise each a sheet metal clip band 77 embracing the two wires preferably midway between each of the two adjacent clamp units, the ends of which are fastened by a rivet 77', as best shown in Fig. 9.

As an alternative embodiment, the binding means may be formed of small-gauge metal wire as at 78, wound about the central portion of the quadrant with its convolutions close together and having its ends twisted together as at 79 and bent radially inwardly to avoid the danger of cutting.

As another alternative embodiment, the securing means may be a small-gauge wire 80, wound with relatively high pitch about the two rings, and extending freely without special securing means for the entire length of each quadrant between successive clamps as shown.

It will be understood that one form of fastening means preferably the clip shown at 42, will be employed for each of the quadrants of the ring.

In use, it is found that the coupling is substantially unyielding in the direction of rotation. This is accounted for by the fact that the clamps firmly grip the rings without possibility of slip, that each clamp is firmly retained against rocking about the threaded element which secures it to the adjoining coupling element, that each clamp unit is firmly secured to the associated hub or bridging member and will not loosen by wear, that the band 19 of the transmission element prevents displacement of the bridges out of parallelism, so that neither hub member can advance with respect to the other, and that the ring quadrants are of such strength relative to the forces transmitted that they will not stretch appreciably under tension. Although thus rigid in the driving direction, the coupling flexes with remarkable facility in every other direction. The hubs can be moved toward each other or drawn apart with little effort to accommodate the coupling for connection between shaft ends separated by varying distances, and similarly the hubs can be displaced with little effort angularly or laterally with respect to each other to correspond to inaccuracies encountered in practice in the relative disposition of the shafts.

In operation, therefore, the coupling will transmit the torque accurately without lag or lead between poorly aligned shafts, while the lateral pressure upon the bearings of the connected shafts will be small even where the misalignment is substantial, the lateral pressure corresponding, of course, to the small force required to deflect the hubs with respect to each other in the course of application. Thus, by the use of my coupling the shafts to be connected need not be disposed with respect to each other with the degree of accuracy required where couplings of less flexibility are employed, effecting corresponding economy in skilled labor. Further advantages and details of operation of the present embodiment will be obvious from the description above of the embodiment shown in Figs. 1 to 5.

The flexible rings, in the embodiment of Figs. 6 to 12, being of drawn wire have had no weaknesses or cracks developed in their edges. In view of the continuity of the edges of the drawn wire the rapidly repeated flexure does not result in any appreciable weakening, where, in the case of the usual stamped metal driving rings or quadrants, the minute cracks in the edges may develop into tears with corresponding need for frequent replacement. As distinguished from ordinary stamped metal rings or quadrants, the lateral edges of which are cut and, therefore, different in character and tenacity from the wider surfaces, I have provided a ring element homogeneous sidewise and edgewise, and of substantially uniform tenacity. My invention embraces broadly, flexible coupling elements of homogeneous surface, whether round or flat, solid or hollow, unitary or composite and devoid of minute cracks.

The flattened wire construction particularly in view of the large diameter affords the desired substantial flexibility in a direction lengthwise of the coupling and substantial stiffness against distortion in a radial or edgewise direction, so that the uniform interval of a quadrant between successive clamps will be maintained throughout. The double flat wire ring has the advantage of greater flexibility lengthwise of the coupling than a single wire ring of double thickness. Each of the two wire rings above, is preferably of sufficient strength to transmit the torque, so that, should one of the wire elements of a quadrant break in operation the coupling will not be disabled. The binding elements which hold the two wire elements of each quadrant together for convenience in assembly, as heretofore pointed out, perform the further function of retaining a ruptured wire against lashing about, and thus serve to prevent damage to other parts of the coupling or of adjacent elements, upon wire breakage. It is, of course, obvious that a circular wire ring may be employed instead of the flattened wire rings, but I prefer the latter for reasons appearing in the foregoing.

Since the coupling does not permit lag or lead of the driven shaft with respect to the driving shaft, it is suitable for driving magnetos. To effect proper timing adjustment of the magnetos so that the spark will take place in correct phase with the engine rotation, one of the hubs is preferably arranged to be adjustable, as shown in Fig. 6. For this purpose the flange 2 is provided with a beveled opening 81 fitting over a beveled or conical flange 82 at the end of the hub and held in frictional driving relation therewith by a nut 83 threaded upon the hub as at 84, and exerting pressure upon the adjacent side of the flange 2.

As best shown in Figs. 6 and 14, a lock washer 85 is interposed between the flange and the nut. This washer is preferably a simple stamping having tongues 102 and 103 to embrace the edges of the flange as shown, and having a circular body 104 affording segments as at 105 projecting beyond the sides of nut 34. Preferably the tongues 102, 103 are normally slightly bent and will be pressed toward each other by the mechanic after application, to snugly embrace the flange, and one of the segments 105 will be bent over the adjacent side of the nut as at 106, thereby firmly holding the nut against rotation relative to the flange.

To effect shaft adjustment, it is obvious that the nut 83 need merely be loosened, the segment 105 being, of course, first bent toward its plane and the hub with its key can be rotated through the desired angle with respect to the flange 2 and the nut then again tightened to frictionally connect the parts and a segment of washer 85 preferably other than that previously used is bent over against a side of the nut for locking. The adjustment means is a simple construction involving only a conical fit between the hub and the flange, and a simple nut and locking washer for tightening the connection.

Preferably a mark such as an arrow 107 pointing toward the hub is scratched into the innermost surface of the flange 2 to assist in reapplying or in adjusting a coupling removed for repair or other purposes, without the need for retiming the magneto. It will be obvious that for this purpose the mechanic before removing the coupling hub from the magneto shaft will scratch the interior surface of the hub as at 86 in alignment with the arrow 107 on the flange, the large open wire ring affording ready access to the inner end of the hub for this purpose.

The timing adjustment construction can, of course, be applied in the embodiment of Figs. 1 to 5 for use of the latter in magneto driving.

Automotive accessory machines, and particularly magnetos are frequently retained against sliding along the supporting bed by the use of short dowel pins projecting downwardly thereinto. Where my coupling is used with such machines, the removal is particularly easy, for the reason that, after taking out the two screws 26 holding a flange to the transmission piece, the machine can be raised vertically sufficiently to remove the dowels from the base, the metal ring flexing readily to cause the rivet heads 59 to clear the notches in the bridging pieces. In the embodiment shown in Figs. 1 to 5, after removal of the pairs of screws 26, the flexible ring can be moved upwardly along the bridging pieces without any obstruction whatsoever. Where instead of screws, bolts and nuts are employed to secure the bent member to the cooperating coupling part, it is apparent that it would, in general, be necessary not only to remove the nuts but also to withdraw the bolts to render possible a lifting of the magneto or other machine with dowels, so that more separate parts would have to be handled and greater inconvenience in disassembly and reassembly would be entailed.

In Figs. 15 and 16 is shown an alternative form of metal ring hub unit. In this embodiment a single metal ring 87 is shown in place of a double ring and the hub and flange are shown formed in a single forging as at 88. For use of the single wire each clamp is preferably formed of a single U-shaped sheet metal clip element 89 straddling the ring from the exterior periphery, and having an indented or struck-in portion 90 in registry with the offset 45 of the wire, said offset being thereby held within a corresponding slot 91 in the opposite surface of the clip.

Figure 11:
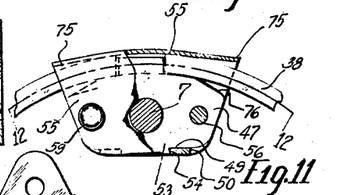
Fig. 11 is a plan view on an enlarged scale of a preferred form of wire clamp.

In this embodiment, although the clamp unit may be formed of a metal plate and provided with a flare as in Figs. 11 and 12, I have shown an alternative form of spring metal clip. Tangs 92 are bent up from one side of the sheet metal clip and forced over the other to maintain the two sides clamped together against the wire, one pair of diametrically opposite clips on each ring being secured to the flanges of the hubs by bolts and the other pair of the bridging pieces by screws substantially as in the other embodiment. The clamping action of the threaded members assists in the gripping action of the clips. In the present embodiment prongs or tangs 93 are bent up from a side of each clip and extend preferably into grooves 93' machined into the surface of the flange 2, which grooves may be coaxial with the coupling, thus serving as anti-rock means to prevent movement of the clips about the bolts as an axis. Similar tangs on the bridging piece clips coact for the same purpose with recesses in the bridging pieces (not shown) in a manner similar to the coaction of rivets 59 with recesses 68 in Fig. 7.

Both leaves of the clips are formed with integral spring tongues extending laterally from opposite sides of the gripping portion, as at 94 and 95 and along the length of the wire, and preferably wide at their bases and tapering to narrow ends, as shown. These spring tongues will be flexed by the ring as the latter is flexed in transmitting torque between poorly aligned shafts. As the tongues are relatively stiff near their bases and more flexible at their narrow ends, the wire will be held thereby against appreciable bending at the point of attachment, but will bend more freely at the tongue ends. Thus, the spring tongues will prevent any sharp, destructive bend of the drawn wire, and will perform substantially the function of the flare in the embodiment of Figs. 10 and 11. In use, when the coupling transmits torque between inaccurately aligned shafts, the spring tongue will return to initial position by virtue of its elasticity as the adjacent portion of the wire ring returns to the neutral plane from its position of maximum flexure.

Although I prefer to employ the specific form of wire clamp element shown in Figs. 11 and 12, it will, of course, be obvious that the spring clip form of Figs. 15 and 16 may be substituted in the form of coupling shown in Figs. 6 to 8, also, that the double wire embodiment of Figs. 6 to 8 may be substituted in the embodiment of Figs. 13 and 14.

An alternative form of clip is shown in Figs. 18 and 19 in which elongated slots 96 are cut near the split ends and also at the ends of each quadrant of the flexible wire, a spacing plate 97 of a thickness equal to the combined thickness of the two flattened wires being placed adjacent the inner periphery thereof, clamping plates 98 straddling the opposite surfaces of the wire both having embossments 99 pressed thereinto to fit into the openings 96, the whole being clasped by a U-shaped outer element 100, straddling the outer periphery of the wires, and held in assembled relation by rivets 101 passing transversely through the outer clip, the clamping plate and the spacing plate.

Obviously many of the details in the various embodiments set forth, and especially the clamp units, the anti-rock arrangement, the flexure limiting flare of Figs. 11 and 12 or the spring metal tongue of Fig. 15 for the same purpose, and the use of drawn wire quadrants or rings or the equivalent are broadly applicable separately or in combination in other relations, for instance, to couplings of the type embodying a single flexible ring member connected at spaced intervals directly to two hubs.

I claim:—

1. In a coupling, in combination, a pair of hub members, flexible driving members corresponding one to each hub member and secured thereto near opposite ends of a diameter, a transmission band member between said flexible members and of width materially smaller than the distance between the two flexible members, and inner diameter sufficiently large for convenient access of a wrench to tighten a fastening nut, and lugs extending outwardly from said band and projecting from opposite edges thereof and in line with each other, and securing means fastening said lugs to said flexible members at points midway between the points of connection of the latter to the hub members, said securing means being accessible for application and removal thereof from the end of the coupling.

2. In a flexible coupling, in combination, a pair of hubs, each having a flange extending outwardly therefrom substantially in the direction of one axial plane of the coupling, a pair of flexible rings secured to said flanges, a pair of bridges connecting said rings at points between the ends of said flanges and a metallic band firmly secured to said bridges and spaced radially from said hubs and laterally from one of the rings and normally in a plane parallel thereto.

3. In a flexible coupling, in combination, a pair of coaxial hubs provided with flanges extending outwardly therefrom substantially in the direction of one axial plane of the coupling, flexible rings coaxial with said hubs and secured near the outer extremities of said flanges, a pair of bridges connecting said rings and extending substantially parallel to the axis of said coupling and a member connecting said bridges midway between the planes of said flexible rings said member being materially narrower than said bridges.

4. In a flexible coupling, in combination, a pair of hubs provided with flanges extending outwardly therefrom substantially in the direction of one axial plane of the coupling and substantially parallel to each other, flexible ring members secured near the outer ends of said flanges, a pair of bridges connected near the peripheries of said flexible rings midway between the ends of said flanges and extending substantially parallel to the axis of said coupling, said bridges having a material width in a direction circumferential of the coupling and being relatively narrower in a direction radial of the coupling and a stamped metal band substantially coaxial with the coupling and passing about the exterior wide surfaces of said bridges and rigidly secured thereto.

5. The combination set forth in claim 4, in which the band is formed from a strip, the ends of which overlap one of the bridges and are riveted thereto, and in which the bridges have integral conformations to provide a snug fit with the adjacent edges of the band to maintain the band accurately at right angles to the bridges.

6. In a coupling, in combination, a pair of hubs, each having a flange extending outwardly therefrom at opposite sides and along a single diameter, flexible annular members carried by said flanges, bridges connecting said annular members and near the periphery thereof and extending substantially parallel to the axis of said coupling and midway between the ends of said flanges, and a band carried by said bridges and connecting the same to maintain them in parallelism.

7. In a coupling, in combination, a pair of hub members, flexible driving members connected to said hub members at spaced points and transmission means connected to said flexible members at points intermediate said spaced points, said transmission means having parts yieldable in a direction transverse of the coupling.

8. In a coupling, in combination, a pair of hub members, flexible driving members connected to said hub members at spaced points and transmission means connected to said flexible members at points intermediate said spaced points, said transmission means including parallel bridges connecting said flexible members at points intermediate the points of connection to said hub members, and an element connecting said bridges having limited flexibility to allow limited approach of said bridges and relatively stiff in other directions to prevent displacement of said bridges out of parallelism.

9. The combination set forth in claim 8 in which the connecting means for the bridges comprises a band of relatively large diameter spaced by a material distance from the flexible members and from the hubs.

10. A flexible coupling comprising in combination, a pair of substantially identical hub units, each carrying a flexible ring, an intermediate transmission member secured to said rings at points intermediate the points of attachment to the hubs, connecting elements extending transversely of said flexible elements for effecting each of the connections to the hubs and to the transmission member, clamp elements frictionally engaging said flexible rings near the periphery thereof and traversed by said connecting elements, said clamp elements being flared at their free edges to determine the limiting flexure of the flexible elements.

11. The combination set forth in claim 10 in which the transmission member has limited flexure in a direction at right angles to the axis of the coupling to relieve the distortion upon the flexible rings when the device transmits power betwen poorly aligned shafts.

12. In a flexible coupling, in combination, a pair of hubs, a transmission member, a flexible ring connecting one of said hubs to one side of the transmission member, and a second flexible ring connecting the other of the hubs to the opposite side of the transmission member, limiting guide means associated with said flexible rings for preventing excessive flexure thereof, said transmitting member having limited flexibility in a non-driving direction to relieve the strain upon said flexible rings when the device transmits power between shaft ends spaced by a distance other than that corresponding to the length of the coupling.

13. In a flexible coupling, in combination, a flexible ring member, a rigid element and means connecting said elements into torque transmitting relation with respect to each other, said means comprising a clamp element frictionally gripping said flexible member, threaded means extending through said clamp element and into said rigid element for clamping said parts together, said clamp element being of stamped metal and having a curved conformation with an outwardly extending rim for determining the limit of curvature of the flexible member when the coupling is connected between poorly aligned shafts.

14. In a flexible coupling, in combination, a pair of hubs, flexible rings carried thereby, a transmission band coaxial with said hubs interposed between said rings and spaced therefrom and connecting means between said band and said rings, said connecting means having bridging portions serving as spacers for said rings, and having portions extending at opposite faces of said rings and securing elements extending transversely of said latter portions into said bridging portion.

15. In a flexible coupling, in combination, a pair of hubs, flexible rings carried thereby, a transmission band coaxial with said hubs interposed between said rings, spaced therefrom and extending within the cylinder determined by the periphery of said rings, connecting means between said band and said rings, said connecting means comprising aligned pairs of clamping portions near the outer periphery of both faces of the rings, and bridging portions secured to said band and connecting the aligned pairs, said bridging portions extending below the periphery of said rings.

16. In a flexible coupling, in combination, a flexible non-metallic ring of substantial thickness, a hub having a flange, rivet members extending transversely of said flexible ring and having rims of substantial thickness for contacting said flange and thereby spacing the ring from the flange at all other points, transverse members for clamping said rivets against said flange and metallic plate elements against opposite surfaces of said flexible rings and traversed by said rings and flared at their lateral edges to allow the flexure of said rings.

17. In a flexible coupling, in combination, a hub having a flange, a flexible non-metallic ring of substantial thickness provided with diametrically opposite metallic plate elements frictionally engaging opposite surfaces thereof, rivets extending transversely through the plates and serving to press them into frictional engagement with the ring, the rim of said rivet adjacent said flange being of substantial thickness and having a squared end, and transverse elements extending through said rivets and through corresponding apertures in said flange for clamping said elements together, said metallic plates being flared at their lateral edges to limit the flexure of said ring.

18. In a flexible coupling, in combination, a pair of hubs, each provided with a flange, flexible rings of rubber composition, means securing said rings to said flanges, said means including a spacer element for affording a gap between the flange and the ring except at the points of securing, and metallic plate members of uniform thickness having flared edges extending in said gap and serving to limit the distortion of said ring toward one side.

19. In a flexible coupling, in combination, a pair of hubs provided with outstanding flanges, rings of rubber composition secured to said flanges at diametrically opposite points, a transmission member interposed between said rings and secured thereto, at diametrically opposite points midway between said points of connection to said flanges; each of said securing means including a pair of metal plates against opposite sides of the rings, said plates being flared at the edges to limit the distortion of the flexible rings, a rivet extending transversely through the ring and serving to secure said plates in position, said rivet having a squared thickened head, and a threaded fastening element extending transversely through the rivet and clamping the squared rivet head against the element to which it secures the ring.

20. In a flexible coupling, in combination, a flat ring of rubber composition, metallic clamp elements at the outer periphrey thereof and at uniform intervals rivets extending through said ring and having their rims overlapping the edges of corresponding openings in said clamp elements, the rivets having relatively thick, square-ended rims alternately at opposite faces of the ring, the lateral edges of the clamp elements being flared.

Signed at New York in the county of New York and State of New York this 4th day of October A. D. 1921.

JOSEPH BIJUR.